United States Patent
Neet et al.

(10) Patent No.: US 7,386,931 B2
(45) Date of Patent: Jun. 17, 2008

(54) METHOD OF FORMING CASCADED STATOR WINDING

(75) Inventors: Kirk E. Neet, Saline, MI (US); Eric David Bramson, Ann Arbor, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 443 days.

(21) Appl. No.: 10/895,567

(22) Filed: Jul. 21, 2004

(65) Prior Publication Data

US 2006/0032044 A1  Feb. 16, 2006

(51) Int. Cl.
*H02K 15/00* (2006.01)
(52) U.S. Cl. .............................. 29/596; 29/597; 29/598; 310/201
(58) Field of Classification Search ........... 29/596–598, 29/605–606, 732–735; 310/179, 184, 254, 310/258–260
See application file for complete search history.

(56) References Cited

U.S. PATENT DOCUMENTS

| | | | |
|---|---|---|---|
| 2,781,465 A | 2/1957 | Schuff | |
| 3,122,667 A | 2/1964 | Baciu | |
| 3,444,407 A | 5/1969 | Yates | |
| 3,566,171 A | 2/1971 | Tichy et al. | |
| 3,634,708 A | 1/1972 | Fisher et al. | |
| 3,660,705 A | 5/1972 | Willyoung | |
| 3,753,060 A | 8/1973 | Greenwell | |
| 3,753,062 A | 8/1973 | Greenwell | |
| 3,780,324 A | 12/1973 | Greenwell | |
| 3,821,846 A | 7/1974 | Pleiss, Jr. et al. | |
| 3,838,322 A | 9/1974 | Greenwell | |
| 3,854,077 A | 12/1974 | Greenwell | |
| 3,884,385 A | 5/1975 | Schaefer | |
| 3,990,029 A | 11/1976 | Kano et al. | |
| 4,115,915 A | 9/1978 | Godfrey | |
| 4,176,444 A | 12/1979 | Walker | |
| 4,197,475 A | 4/1980 | Ban et al. | |
| 4,206,621 A | 6/1980 | Kawasaki et al. | |
| 4,451,749 A | 5/1984 | Kanayama et al. | |
| 4,617,725 A | 10/1986 | Holter et al. | |
| 4,757,601 A | 7/1988 | Leech et al. | |
| 4,808,868 A | 2/1989 | Roberts | |
| 4,829,206 A | 5/1989 | Honshima et al. | |
| 4,896,063 A | 1/1990 | Roberts | |
| 4,959,573 A | 9/1990 | Roberts | |
| 5,231,324 A | 7/1993 | Kawamura et al. | |

(Continued)

FOREIGN PATENT DOCUMENTS

EP  1 134 872  9/2001

(Continued)

*Primary Examiner*—Minh Trinh
(74) *Attorney, Agent, or Firm*—Brinks Hofer Gilson & Lione

(57) ABSTRACT

A method of forming a stator for an electric machine having a cascaded winding includes the steps of: providing a stator core having a plurality of circumferentially spaced and axially-extending core slots in a surface thereof, forming a plurality of A conductors and a plurality of B conductors, arranging the A and B conductors into a wire pack, rolling the wire pack into a cylindrical shape and inserting the wire pack within the stator core, and expanding the wire pack radially outward such that the wire pack is inserted within the slots of the stator core.

20 Claims, 11 Drawing Sheets

U.S. PATENT DOCUMENTS

| | | | |
|---|---|---|---|
| 5,343,105 A | 8/1994 | Sakabe et al. | |
| 5,444,321 A | 8/1995 | Honda et al. | |
| 5,449,962 A | 9/1995 | Shichijyo et al. | |
| 5,519,266 A | 5/1996 | Chitayat | |
| 5,539,265 A | 7/1996 | Harris et al. | |
| 5,708,316 A | 1/1998 | Ishida | |
| 5,714,824 A | 2/1998 | Couture et al. | |
| 5,864,193 A | 1/1999 | Katoh | |
| 5,936,326 A | 8/1999 | Umeda et al. | |
| 5,955,804 A | 9/1999 | Kusase et al. | |
| 5,955,810 A | 9/1999 | Umeda et al. | |
| 5,962,943 A | 10/1999 | Shervington | |
| 5,965,965 A | 10/1999 | Umeda et al. | |
| 5,986,375 A | 11/1999 | Umeda et al. | |
| 5,994,802 A | 11/1999 | Shichijyo et al. | |
| 5,994,813 A | 11/1999 | Umeda et al. | |
| 5,998,903 A | 12/1999 | Umeda et al. | |
| 6,011,332 A | 1/2000 | Umeda et al. | |
| 6,037,695 A | 3/2000 | Kanazawa et al. | |
| 6,049,154 A | 4/2000 | Asao et al. | |
| 6,051,906 A | 4/2000 | Umeda et al. | |
| 6,059,969 A | 5/2000 | Mizutani | |
| 6,078,116 A | 6/2000 | Shiga et al. | |
| 6,091,169 A | 7/2000 | Umeda et al. | |
| 6,097,130 A | 8/2000 | Umeda et al. | |
| 6,124,660 A | 9/2000 | Umeda et al. | |
| 6,137,201 A | 10/2000 | Umeda et al. | |
| 6,137,202 A | 10/2000 | Holmes et al. | |
| 6,147,430 A | 11/2000 | Kusase et al. | |
| 6,147,432 A | 11/2000 | Kusase et al. | |
| 6,166,461 A | 12/2000 | Kusase et al. | |
| 6,177,747 B1 | 1/2001 | Maeda et al. | |
| 6,181,043 B1 | 1/2001 | Kusase et al. | |
| 6,181,045 B1 | 1/2001 | Umeda et al. | |
| 6,201,332 B1 | 3/2001 | Umeda et al. | |
| 6,204,586 B1 | 3/2001 | Umeda et al. | |
| 6,208,060 B1 | 3/2001 | Kusase et al. | |
| 6,211,594 B1 | 4/2001 | Umeda et al. | |
| 6,222,295 B1 | 4/2001 | Umeda et al. | |
| 6,242,835 B1 | 6/2001 | Uemura et al. | |
| 6,242,836 B1 | 6/2001 | Ishida et al. | |
| 6,252,326 B1 | 6/2001 | Umeda et al. | |
| 6,268,678 B1 | 7/2001 | Asao et al. | |
| 6,281,614 B1 | 8/2001 | Hill | |
| 6,285,105 B1 | 9/2001 | Asao et al. | |
| 6,291,918 B1 | 9/2001 | Umeda et al. | |
| 6,333,573 B1 | 12/2001 | Nakamura | |
| 6,335,583 B1 | 1/2002 | Kusase et al. | |
| 6,337,530 B1 | 1/2002 | Nakamura et al. | |
| 6,348,750 B1 | 2/2002 | Taji et al. | |
| 6,373,164 B1 | 4/2002 | Nishimura | |
| 6,407,476 B1 | 6/2002 | Nishimura | |
| 6,484,388 B1 | 11/2002 | Amiec et al. | |
| 6,501,204 B1 | 12/2002 | Oohashi et al. | |
| 6,501,205 B1 | 12/2002 | Asao et al. | |
| 6,504,283 B1 | 1/2003 | Asao et al. | |
| 6,552,463 B2 | 4/2003 | Oohashi et al. | |
| 6,570,289 B1 | 5/2003 | Liang et al. | |
| 6,573,622 B2 | 6/2003 | Lim et al. | |
| 6,664,703 B2 | 12/2003 | Oketani et al. | |
| 6,742,238 B2 | 6/2004 | Lee | |
| 6,750,582 B1 * | 6/2004 | Neet | 310/208 |
| 6,882,077 B2 * | 4/2005 | Neet | 310/208 |
| 6,930,426 B2 * | 8/2005 | Neet et al. | 310/208 |
| 7,042,129 B2 * | 5/2006 | Neet | 310/208 |
| 7,075,206 B1 * | 7/2006 | Chen | 310/179 |
| 7,081,697 B2 * | 7/2006 | Neet | 310/216 |
| 2001/0011852 A1 | 8/2001 | Nakamura et al. | |
| 2001/0019234 A1 | 9/2001 | Murakami et al. | |
| 2001/0020807 A1 | 9/2001 | Imori et al. | |
| 2001/0024071 A1 | 9/2001 | Yoshida et al. | |
| 2001/0026109 A1 | 10/2001 | Higashino et al. | |
| 2001/0030487 A1 | 10/2001 | Higashino et al. | |
| 2001/0040415 A1 | 11/2001 | Asao et al. | |
| 2001/0040416 A1 | 11/2001 | Nakamura et al. | |
| 2001/0040418 A1 | 11/2001 | Higashino et al. | |
| 2002/0033646 A1 | 3/2002 | Tanaka et al. | |
| 2002/0125784 A1 | 9/2002 | Bramson et al. | |
| 2003/0132680 A1 | 7/2003 | Nakamura et al. | |
| 2003/0137204 A1 | 7/2003 | Neet | |
| 2003/0137205 A1 | 7/2003 | Neet | |
| 2003/0137207 A1 | 7/2003 | Tamura et al. | |
| 2003/0173860 A1 | 9/2003 | Even | |
| 2003/0193253 A1 | 10/2003 | Arimitsu et al. | |
| 2004/0145267 A1 | 7/2004 | Lowry et al. | |

FOREIGN PATENT DOCUMENTS

| | | |
|---|---|---|
| EP | 1 109 289 | 4/2002 |
| JP | 55 120114 | 9/1980 |
| JP | 56 83911 | 7/1981 |
| JP | 57-206244 A | 12/1982 |
| JP | 58 192447 | 11/1983 |
| JP | 61-189155 | 8/1986 |
| JP | 3-107342 A | 5/1991 |
| JP | 11-178264 | 7/1999 |

* cited by examiner

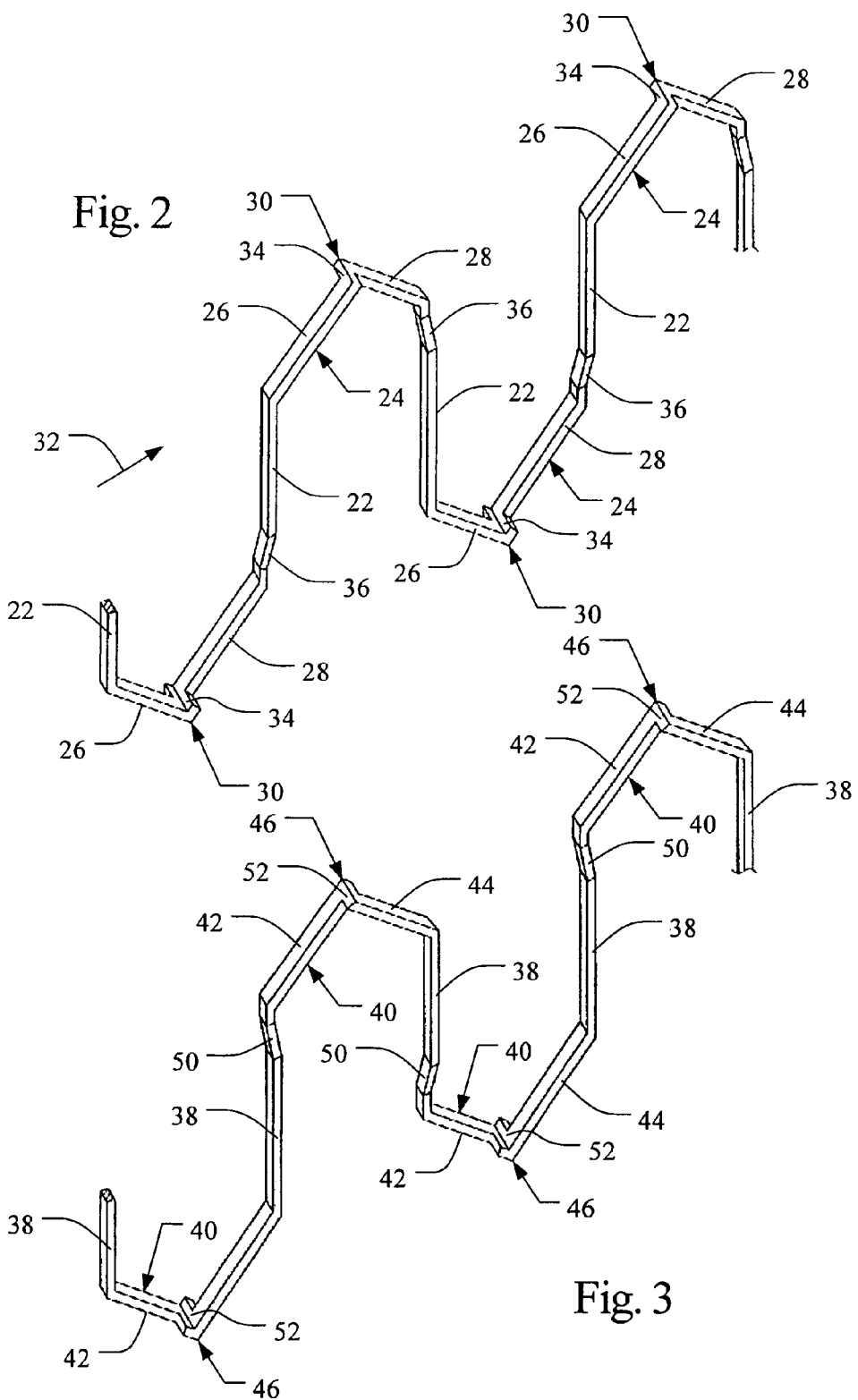

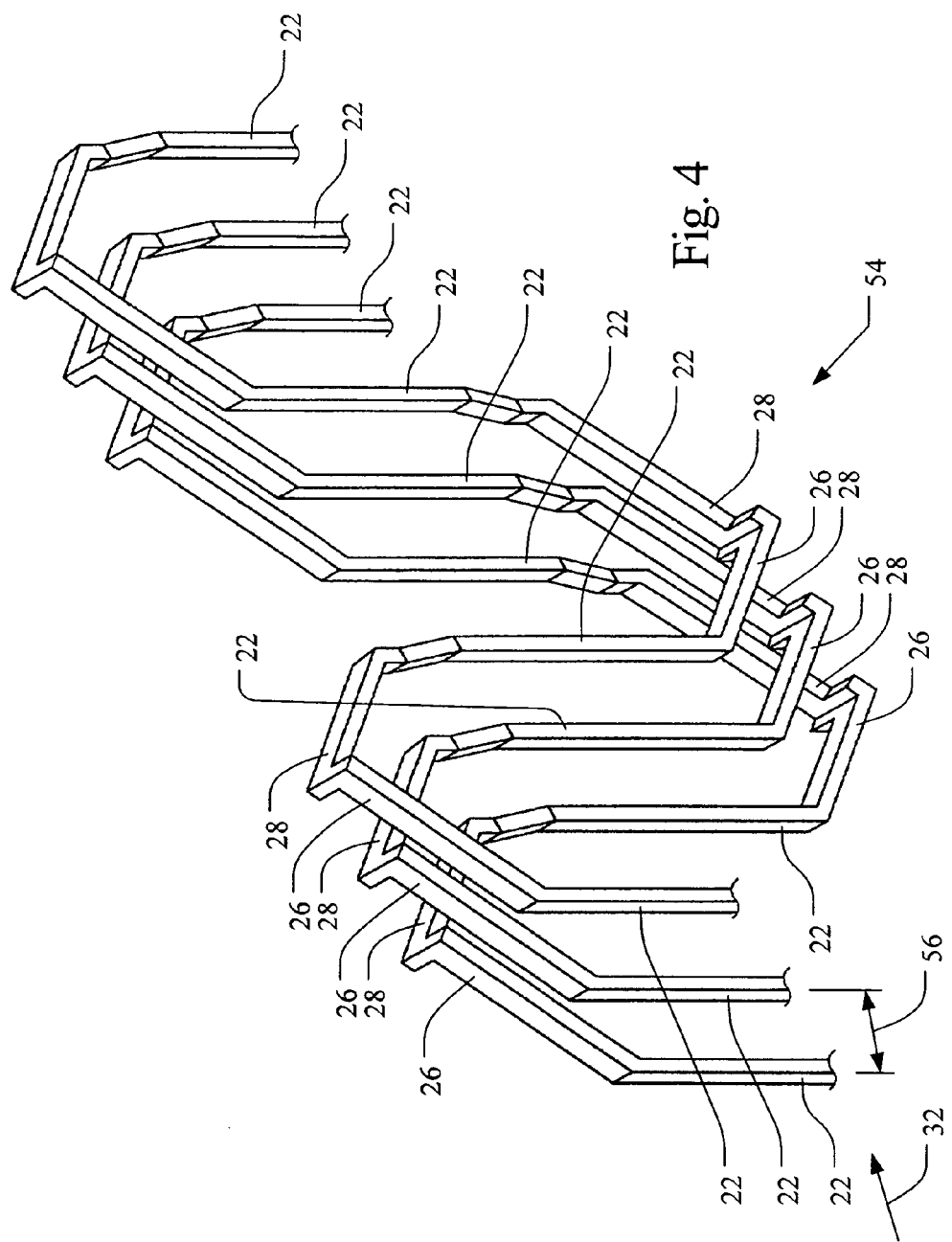

METHOD OF FORMING CASCADED STATOR WINDING

BACKGROUND OF THE INVENTION

The present invention relates generally to electric machines and, in particular, to a stator winding for an electric machine having cascaded end loops. Electric machines, such as alternating current electric generators, or alternators are well known. Prior art alternators typically include a stator assembly and a rotor assembly disposed in an alternator housing. The stator assembly is mounted to the housing and includes a generally cylindrically-shaped stator core having a plurality of slots formed therein. The rotor assembly includes a motor rotor attached to a generally cylindrical shaft that is rotatably mounted in the housing and is coaxial with the stator assembly. The stator assembly includes a plurality of wires wound thereon, forming windings. The stator windings are formed of slot segments that are located in the slots and end loop sections that connect two adjacent slot segments of a conductor of each phase and are formed in a predetermined multi-phase (e.g. three or six) winding pattern in the slots of the stator core. A term phase, utilized herein, is defined as the group of conductors having slot segments disposed in substantially the same core slots. The rotor assembly can be any type of rotor assembly, such as a "claw-pole" rotor assembly, which typically includes opposed poles as part of claw fingers that are positioned around an electrically charged rotor coil. The rotor coil produces a magnetic field in the claw fingers. As a prime mover, such as a steam turbine, a gas turbine, or a drive belt from an automotive internal combustion engine, rotates the rotor assembly, the magnetic field of the rotor assembly passes through the stator windings, inducing an alternating electrical current in the stator windings in a well known manner. The alternating electrical current is then routed from the alternator to a distribution system for consumption by electrical devices or, in the case of an automotive alternator, to a rectifier and then to a charging system for an automobile battery.

One type of device is a high slot fill stator, which is characterized by rectangular shaped conductors that are aligned in one radial row in each slot and that fit closely to the width of the rectangular shaped core slots. High slot fill stators are advantageous because they are efficient and help produce more electrical power per winding than other types of prior art stators. These stators, however, are disadvantageous because the windings are typically interlaced, in which the wires are required to alternate outer and inner radial portions of each slot. This is because one end loop connects the slot segment housed in an outer radial depth of the first slot to a slot segment housed in an inner radial depth of the second slot. This conductor leaves a void in the outer radial depth of the second slot, therefore a second conductor must connect the slot segment housed in an outer radial depth of the second slot to a slot segment housed in an inner radial depth of the third slot. These interlaced windings require an interlacing process to interlace the conductors of all the phases prior to inserting the winding into the core and therefore disadvantageously increase the complexity of placing the winding the stator.

A cascaded winding solves many of the problems associated with the high slot fill stator winding described above. The cascaded winding is described fully in U.S. patent application Ser. No. 10/443,441, filed on May 22, 2003, which is assigned to the assignee of the present application and is hereby incorporated by reference into the present application. The present application is directed to a method of forming the cascaded winding.

SUMMARY OF THE INVENTION

A method for forming a cascaded stator winding includes the steps of: providing a stator core having a plurality of circumferentially spaced and axially-extending core slots in a surface thereof, forming a plurality of A conductors and a plurality of B conductors, arranging the A and B conductors into a wire pack, rolling the wire pack into a cylindrical shape and inserting the wire pack within the stator core, and expanding the wire pack radially outward such that the wire pack is inserted within the slots of the stator core.

The cascaded winding pattern formed in accordance with the method of the present application advantageously does not require the complex interlaced winding process or the hairpin conductors of the prior art. The stator winding is cascaded and not interlaced because for a portion of a conductor which includes at least four consecutive slot segments, the slot segments are located at substantially the same radial distance from the central axis of the stator core and, therefore, do not alternate rearward and forward positions in the slot with other conductors. In addition, the stator winding is cascaded and not interlaced because for a portion of conductors wherein each conductor includes at least four consecutive slot segments and each conductor portion is located in generally the same circumferential location, the end loop segments are formed such that the conductors are radially aligned in each layer, i.e. for the portion of conductors disposed in the same layer, the first conductor could be fully radially inserted into the core prior to the portion of the second conductor, which could be fully radially inserted into the core prior to the portion of the third conductor and so forth.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 2 is an enlarged perspective view of a portion of the A conductor shown in FIG. 1 indicated by the circle labeled "FIG. 2";

FIG. 3 is a perspective view similar to FIG. 2 of an enlarged portion of a B conductor;

FIG. 4 is a perspective view of a portion of a magazine of A conductors;

DESCRIPTION OF THE EMBODIMENTS

A stator core having a cascaded winding is described in patent application Ser. No. 10/443,441, filed on May 22, 2003, which is assigned to the assignee of the present application and is hereby incorporated by reference into the present application.

Figure 11:
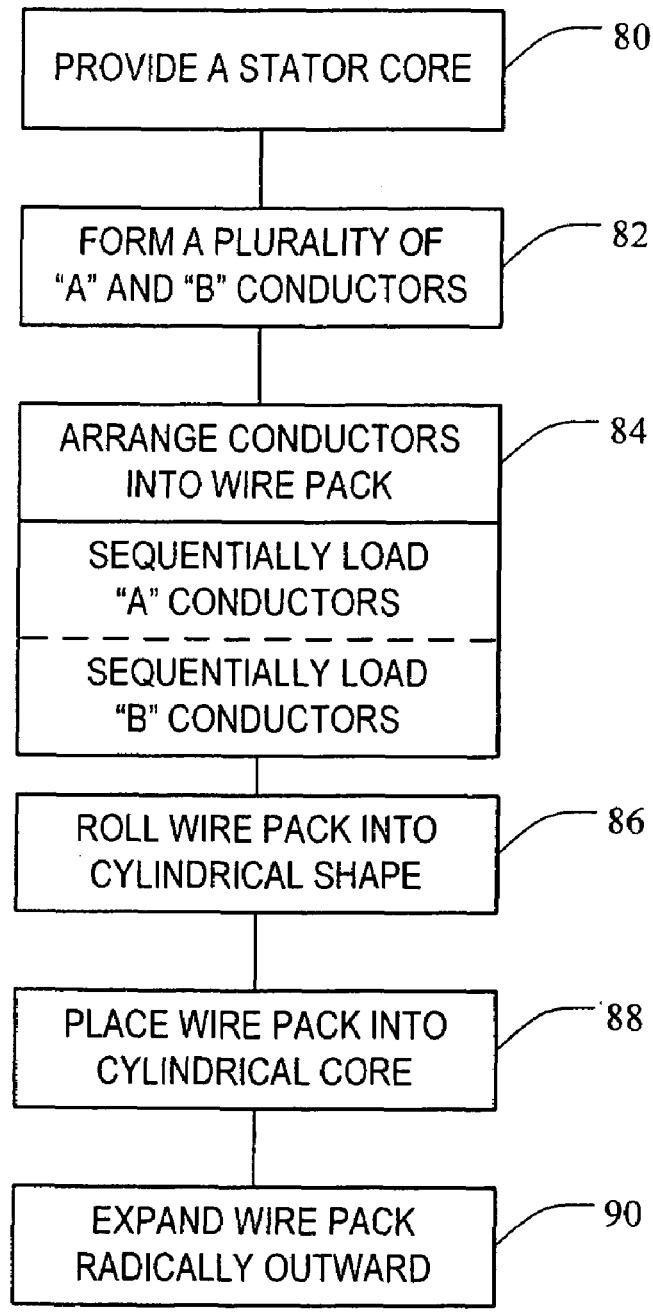
FIG. 11 is a flow chart illustrating the method of the present invention.

As seen in FIG. 11, a method of forming a stator core having a cascaded stator winding includes the steps of: providing a stator core 10 having a plurality of circumferentially spaced and axially-extending core slots 12 formed therein (box 80), forming a plurality of A conductors 14, forming a plurality of B conductors 16 (box 82), arranging the A and B conductors 14,16 into a wire pack 18 (box 84), rolling the wire pack 18 into a cylindrical shape (box 86), placing the wire pack 18 within the stator core 10 (box 88), and expanding the wire pack 18 radially outward such that the wire pack 18 is inserted within the slots 12 of the stator core 10 (box 90).

Figure 1:
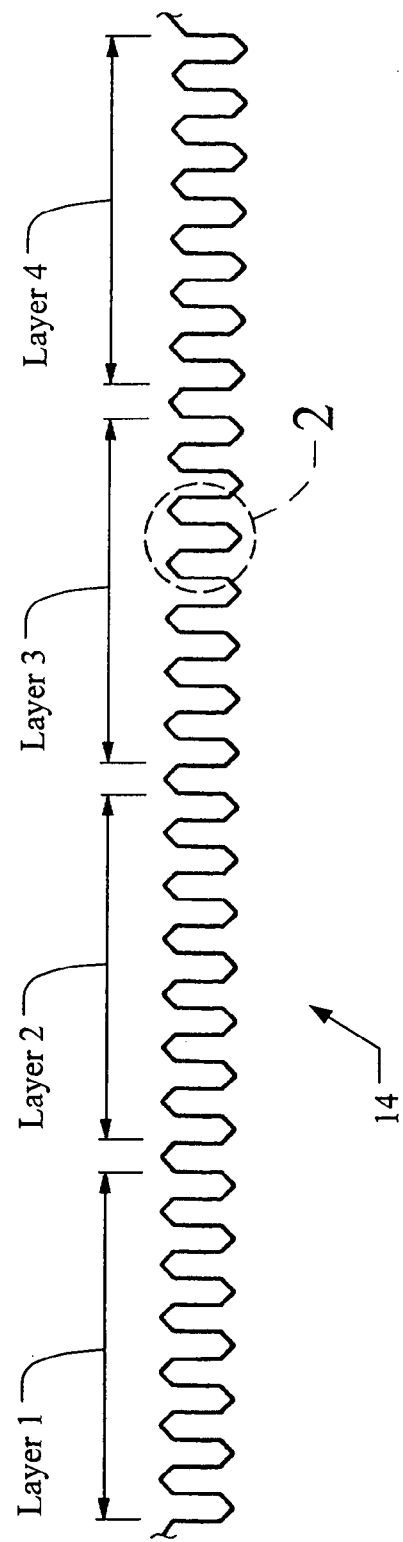
FIG. 1 is a side view of an A conductor having a plurality of layers.

Each of the A and B conductors 14, 16 may be formed from a single continuous conductor 20, as shown in FIG. 1. The conductor 20 is defined as having a plurality of sections, indicated as Layer 1, Layer 2, Layer 3 and Layer 4 in FIG. 1, wherein each section, such as Layer 1, has a number of slot segments 22 equal to the number of core slots 12 divided by the number of phases. The at least half of the slot segments 22 of each section, such as layer 1, will be disposed in the core slots 12 at substantially the same radial distance from the central axis of the stator core 10, or in the same layer.

Referring to FIG. 2, each A conductor 14 includes a plurality layers having a plurality of slot segments 22 alternately connected at first and second ends by a plurality of end loop segments 24. Each end loop segment 24 includes a first sloped portion 26 and a second sloped portion 28 that meet at an apex portion 30. The slot segments 22 of each layer are radially aligned with one another, as indicated by reference numeral 42. In the A conductors 14, the first sloped portion 26 of the end loop segment 24 is aligned with the slot segments 22, however, the second sloped portion 28 of the end loop segment 24 is offset from the slot segments 22 and the first sloped portion 26, as shown in FIG. 2.

The end loop segment 24 of the A conductors 14 includes a first extension portion 34 and a second extension portion 36. The first extension portion 34 connects the apex portion 30 to the second sloped portion 28 and the second extension portion 36 connects the second sloped portion 28 to the next slot segment 22. The first and second extension portions 34, 36 offset the second sloped portion 28 from the slot segments 22 and the first sloped portion 26 of the A conductor 14.

Referring to FIG. 3, each B conductor 16 also includes a plurality layers having a plurality of slot segments 38 alternately connected at first and second ends by a plurality of end loop segments 40. Each end loop segment 40 includes a first sloped portion 42 and a second sloped portion 44 that meet at an apex portion 46. The slot segments 38 of each layer are radially aligned with one another, as indicated by reference numeral 48. In the B conductors 16, the second sloped portion 44 of the end loop segment 40 is aligned with the slot segments 38, and the first sloped portion 42 of the end loop segment 40 is offset from the slot segments 38 and the second sloped portion 44, as shown in FIG. 3.

The end loop segment 40 of the B conductors 16 includes a first extension portion 50 and a second extension portion 52. The first extension portion 50 connects a slot segment 38 to the first sloped portion 42 and the second extension portion 52 connects the first sloped portion 42 to the apex portion 46 of the end loop segment 40. The first and second extension portions 50, 52 offset the first sloped portion 42 from the slot segments 38 and the second sloped portion 44 of the B conductor 16.

The A and B conductors 14, 16 are then arranged into a wire pack 18. The wire pack 18 is formed by sequentially loading the A conductors 14 into a magazine 54 with each subsequent A conductor 14 shifted one pitch 56 in a first direction (to the right in FIG. 3) of the previous A conductor 14, as shown in FIG. 4. The magazine 54 may be a linear magazine or may be a circular magazine. For a stator core 10 having S number of core slots 12 and L number of layers and P number of phases, the magazine 54 should have at least (S*L/2)+P number of slots. The slots in the magazine 54 are deep enough to accept an inner portion and an outer portion of slot segments 22, 38. I.E, the winding of FIG. 5a would have the layer 32 disposed in the outer portion and the layer 48 disposed in the inner portion of the magazine 54. The respective slot segments 22 are spaced apart by a circumferential distance or pitch 56. The circumferential pitch 56 is substantially equal to the circumferential distance between a pair of adjacent core slots 12 of a particular phase at the inner diameter 58 of the stator core 10. The at least half of the slot segments 22 of the A conductors 14 are disposed in outer portion of the slots of the magazine 54. FIG. 4 shows three A conductors 14 loaded together with each A conductor 14 being shifted one pitch 56 to the right of the previous A conductor 14, appropriate for a three-phase winding, but those skilled in the art will appreciate that any appropriate number of A conductors 14 could be used for a particular application—i.e., for a six-phase winding, six A conductors would be utilized.

Figure 5A:
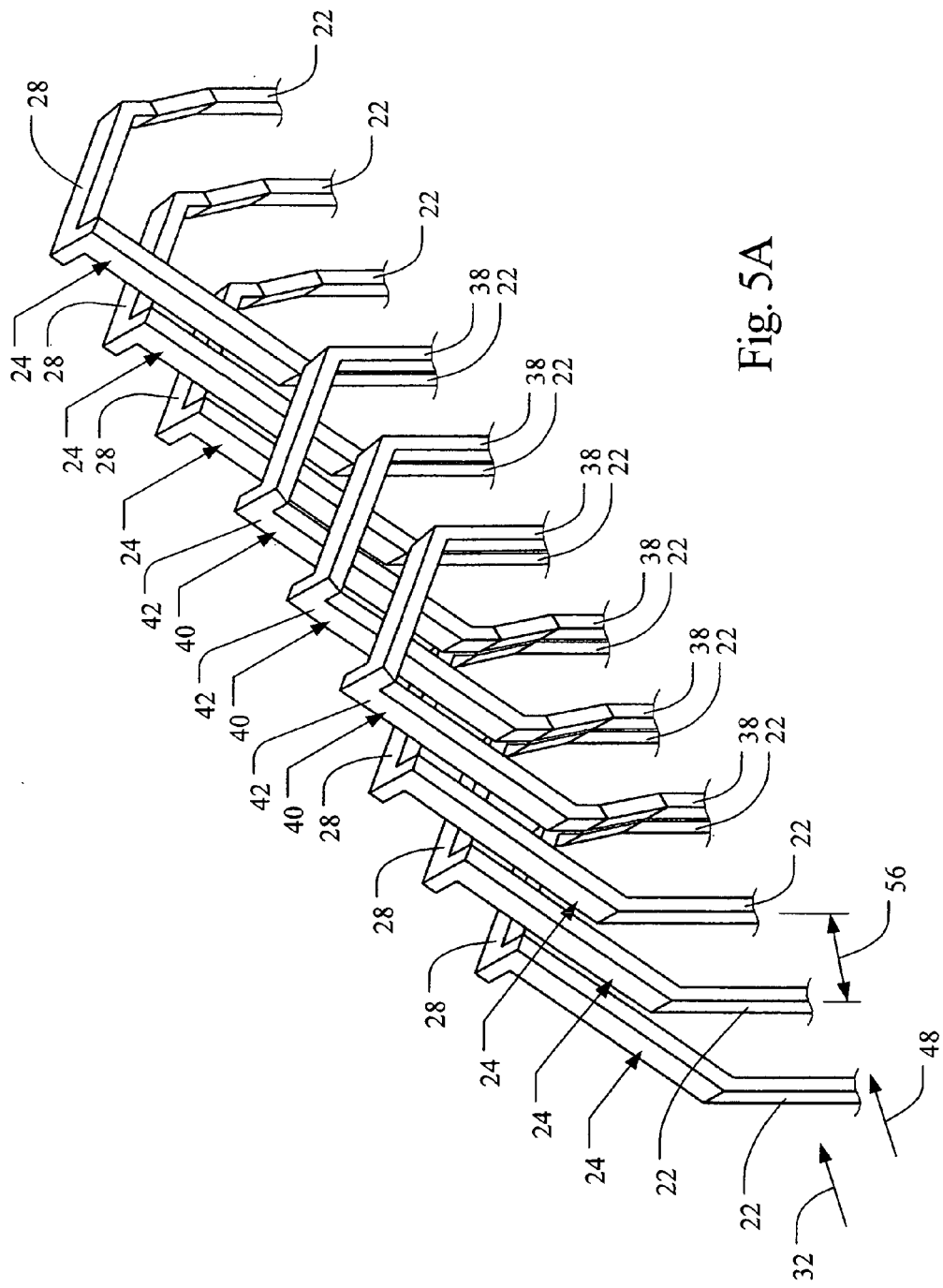
FIG. 5a is a perspective view of a portion of a wire pack having a magazine of A conductors with a layer of B conductors loaded thereon.
Figure 5B:
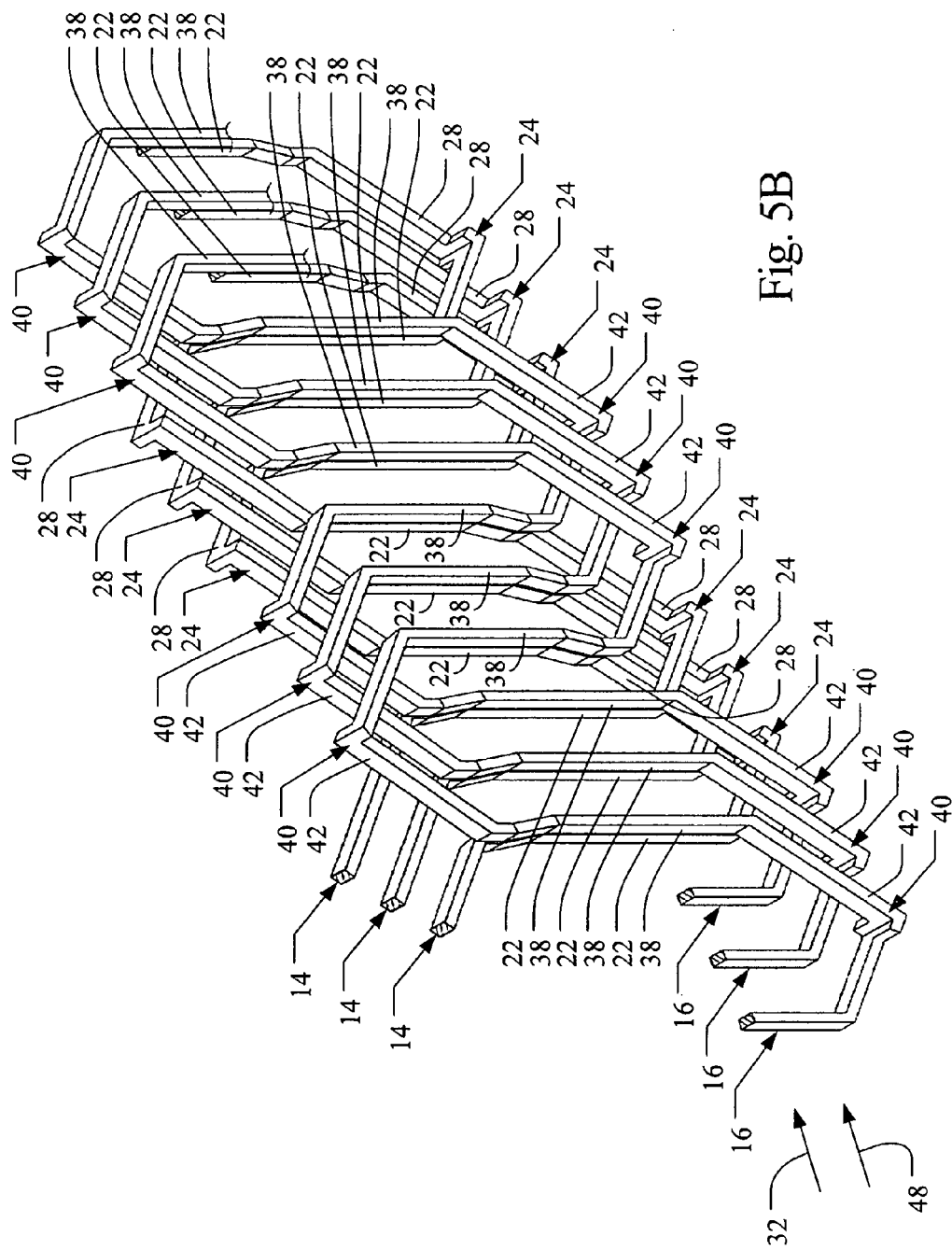
FIG. 5b is a perspective view similar to FIG. 5a showing end loop portions at both ends of the slot segments.

After the A conductors 14 have been loaded onto one another as shown in FIG. 4, the B conductors 16 are sequentially loaded on top of the magazine 54 of A conductors 14. The first B conductor 16 is placed onto the magazine 54 of A conductors 14 shifted one pitch 56 in a second direction which is opposite of the first direction (to the left in FIG. 3) of the first A conductor 14. Each subsequent B conductor 16 is shifted one pitch 56 in the second direction (to the left in FIG. 3) of the previous B conductor 16, resulting in a wire pack 18 such as shown in FIGS. 5a and 5b. The at least half of the slot segments 22 of the B conductors 16 lay inward of the slot segments 22 of the A conductor and are substantially disposed in the inner portion of the slots of the magazine 54. The slots segments 22 of the B conductor which are disposed in slots of the magazine 54 just to the second direction (to the left in FIG. 3) of the ends of the A conductors, are disposed in slots not occupied by slot segments 22 of the A conductors and may be substantially disposed in the outer portion of the slots of the magazine 54.

Referring to FIGS. 5a and 5b, a portion of one layer of a magazine of A conductors 14 similar to that shown in FIG. 4 is indicated at 32 with the corresponding portion of a layer of the B conductors 16 indicated at 48. The layer of A conductors 14 includes a plurality of end loop segments 24, and the layer of B conductors 16 includes a plurality of end loop segments 40. The B conductors 16, including the end loop segments 40, are similar to the A conductors 14, including the end loop segments 24, except that the B conductors 16 are inserted into the core slots 12, shifted by one pitch 56, and the B conductors 16 have end loop segments 40 that have offset first sloped portions 42, which is opposite the end loop segments 24 of the A conductors 14, which have offset second sloped portions 28.

As can best be seen in FIG. 5a, the offset first sloped portion 42 of the B conductors 16 extends outward where it becomes substantially aligned with the slot segments 22 of the A conductors 14, but because it is shifted by one pitch, it does not violate the space of the end loop segments 24 of the A conductors 14. This allows the end loop segments 24 of the A conductors 14 and the end loop segments 40 of the B conductors 16 to cascade together.

While the slot segments 22, 38 are shown generally coplanar in FIGS. 5a and 5b for illustrative purposes, the slot segments 22, 38 are preferably adapted to be received by a radially curved surface, such as the interior surface of the stator core 10 and, therefore, are not coplanar but are co-radial. The width of each of the slot segments 22, 38, including any insulation, preferably fits closely to the width of the core slots 12, including any insulation.

Figure 6:
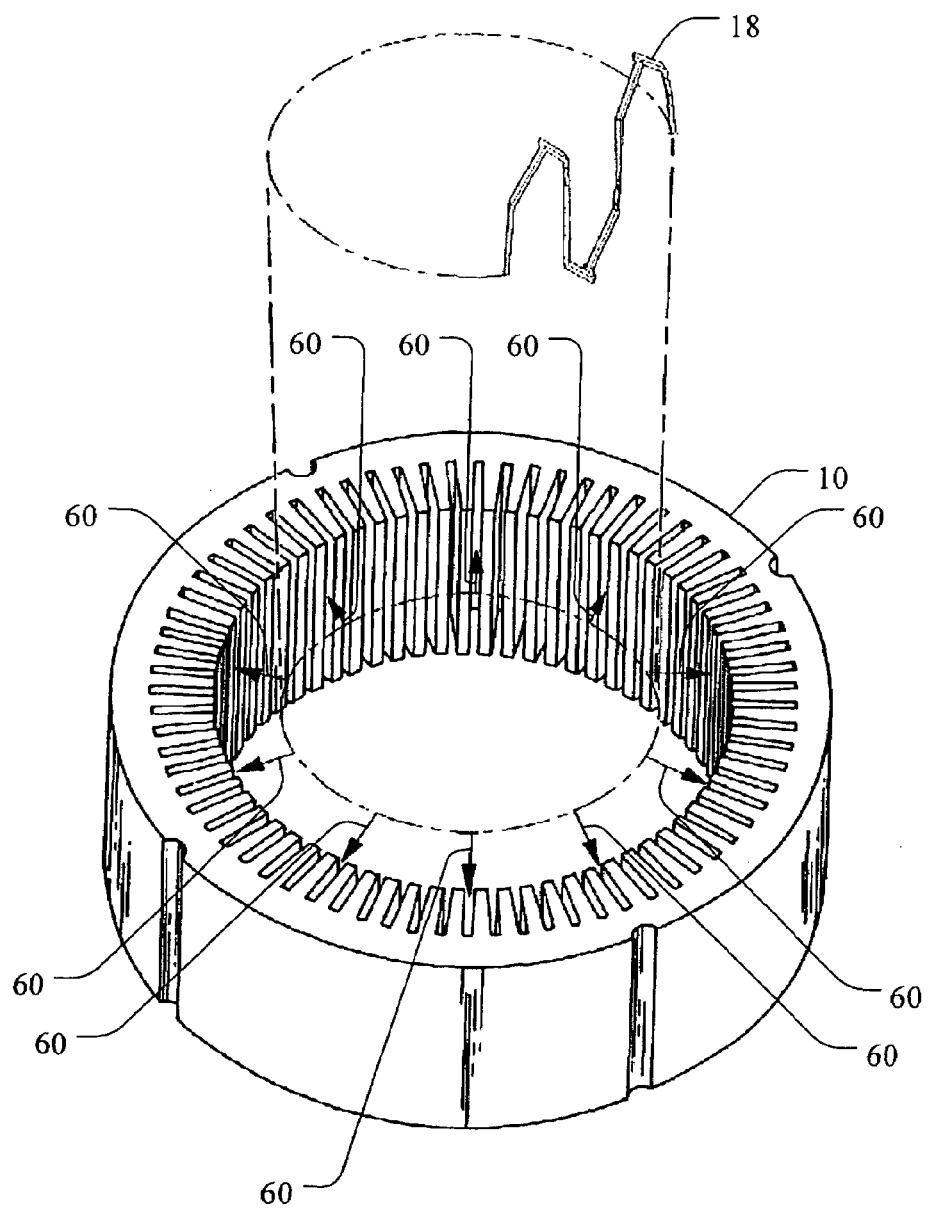
FIG. 6 is a schematic view of a coiled wire pack being inserted within a stator core.

Referring to FIG. 6, after the wire pack 18 is formed, the wire pack 18 is coiled into a cylindrical shape wherein the layers are radially aligned with one another. The wire pack 18 is formed into a cylindrical shape having an outer dimension which allows the wire pack 18 to be placed within the stator core 10.

After the wire pack 18 is placed within the stator core 10, the wire pack 18 is expanded outward, as indicated by arrows 60, such that the slot segments 22, 38 of the A and B conductors 14, 16 are inserted within the slots 12 of the stator core 10. Because the slot segments 22, 38 of the wire pack 18 are radially inserted into the core slots 12, the slot segments 22, 38 must have a narrower circumferential width than the circumferential width of the core slots 12, at the inner diameter 58, just prior to insertion. Therefore after insertion, the slot segments 22, 38 may have the potential of "falling" radially inward and out of the core slots. Consequently, after the wire pack 18 has been placed to the stator core 10, the conductors 14, 16 may be bonded together and to any slotliners within the stator core 10 by using a stator varnish process. A stator varnish process has commonly been used in the industry to bond wires together to prevent vibration of the wires but because the typical circumferential width of the core slot 12 has been narrower than the typical circumferential width of the slot segment 22, 38, the stator varnish process has not been required to prevent the slot segments 22, 38 from "falling" out of the core slots 12. The term varnish process includes a process of bonding the wires together by applying a bonding agent such as, but not limited to, polyester or epoxy.

Each A and B conductor of each phase includes a first lead and a second lead. For a stator having L number of layers, for each phase, the second lead of the A and B conductors are connected together resulting in a winding having L number of electrical turns. This is known as a winding having the conductors A and B of each phase connected in series and results in the first leads of conductors A being defined as a first ends 60 and the first leads of conductors B being defined as second ends 62. Alternatively, for each phase, a first connection is formed by connecting the first lead of conductor A to the second lead of conductor B and a second connection is formed by connecting the second lead of conductor A to the first lead of conductor B, resulting in a winding having L/2 number of electrical turns. This is known as a winding having the conductors A and B of each phase connected in parallel and results in the first connections being defined as a first ends 60 and the second connections being defined as a second ends 62.

Figure 7:
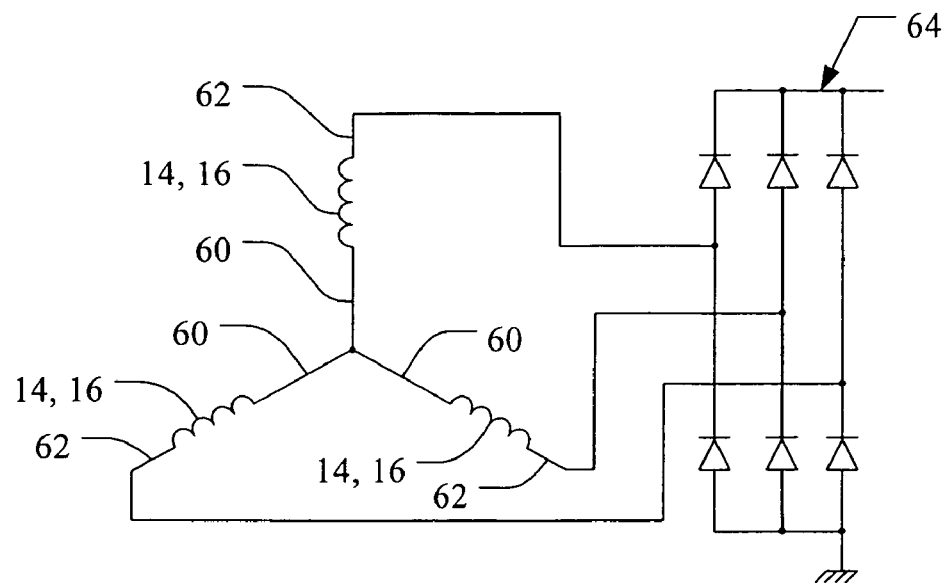
FIG. 7 is a schematic view of a stator with a cascaded winding of the present invention wherein the conductors are connected in a "wye" arrangement.
Figure 8:
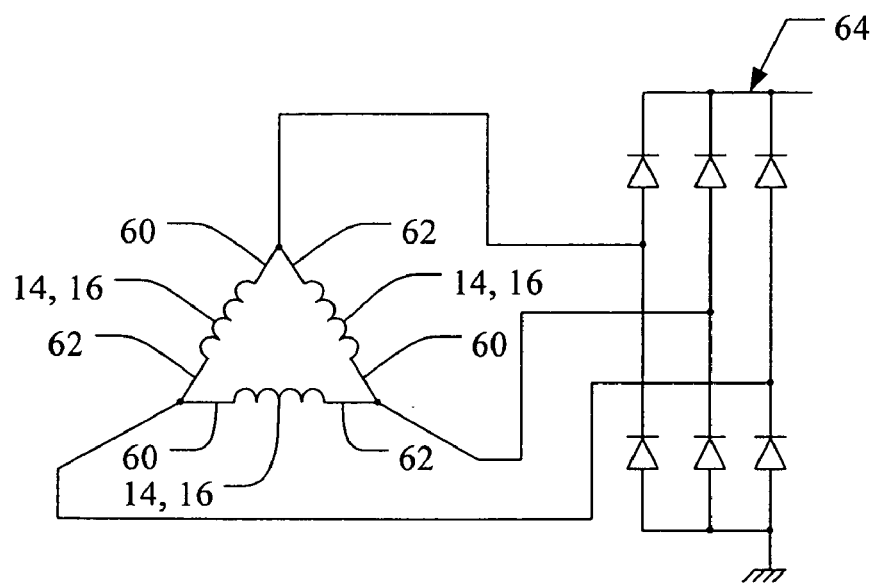
FIG. 8 is a schematic view of a stator with a cascaded winding of the present invention wherein the conductors are connected in a "delta" arrangement.
Figure 7A:
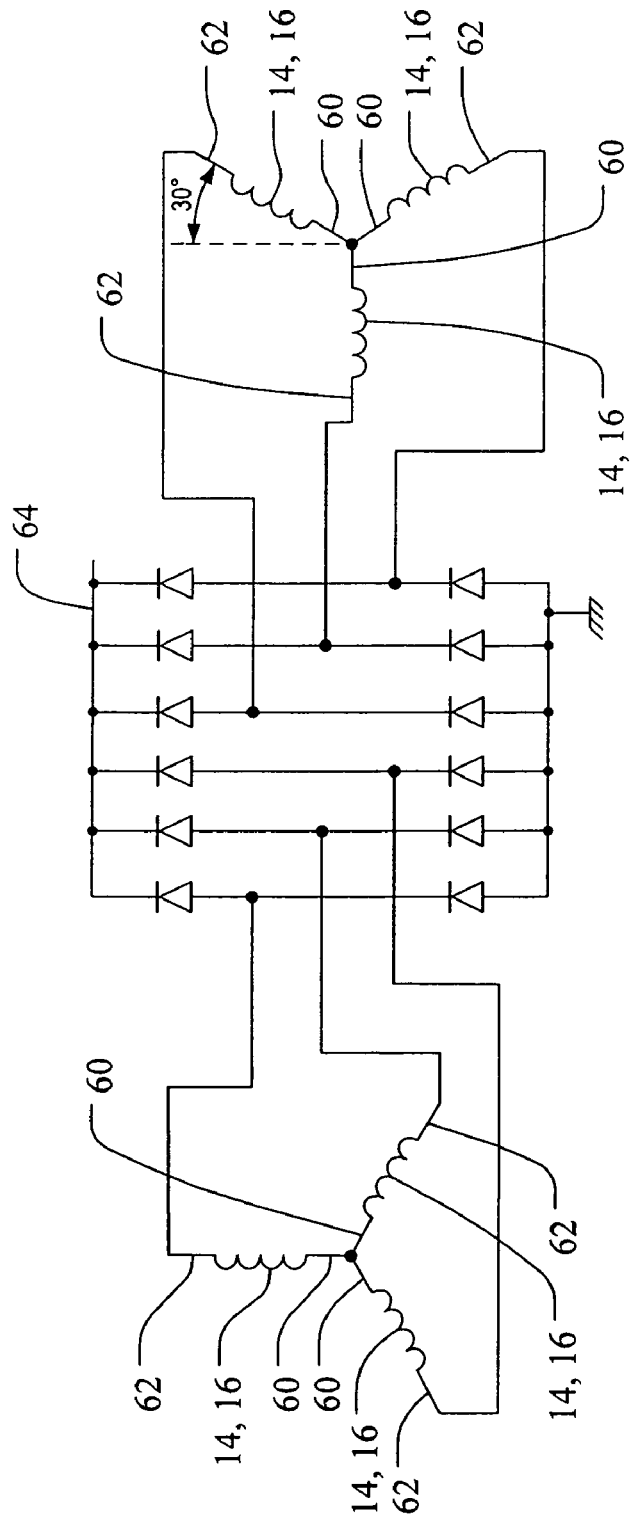
FIG. 7a is a schematic view of a stator with a cascaded winding of the present invention wherein the conductors are connected in a multiple wye arrangement.

Each phase is comprised of conductors 14 and 16 and includes a first end 60 and a second end 62. In one embodiment, the first ends 60 of the phases comprised of conductors 14, 16 are connected to one another and the second ends 62 are connected to a recitifier 64 to form a "wye" arrangement. Referring to FIG. 7, a schematic of a stator having three phases is shown. The first ends 60, or the neutral ends, are connected to one another and the second ends 62, or the positive ends, are connected to a rectifier 64. Referring to FIG. 7a, for a stator having six phases comprised of conductors 14, 16, every other one of the phases are connected together as in FIG. 7 to form a wye arrangement and the other remaining half of the phases are connected together as in FIG. 7 to form another wye arrangement forming a multiple wye winding. Referring to FIG. 8, alternatively, the first and second ends 60, 62 of the phases comprised of conductors 14, 16 are connected to one another and then to a rectifier 64 to form a "delta" arrangement. Alternatively, for a stator having six phases comprised of conductors 14, 16, every other one of the phases are connected together as in FIG. 8 to form a delta arrangement and the other remaining half of the phases are connected together as in FIG. 8 to form another delta arrangement forming a multiple delta winding (not shown).

Figure 9:
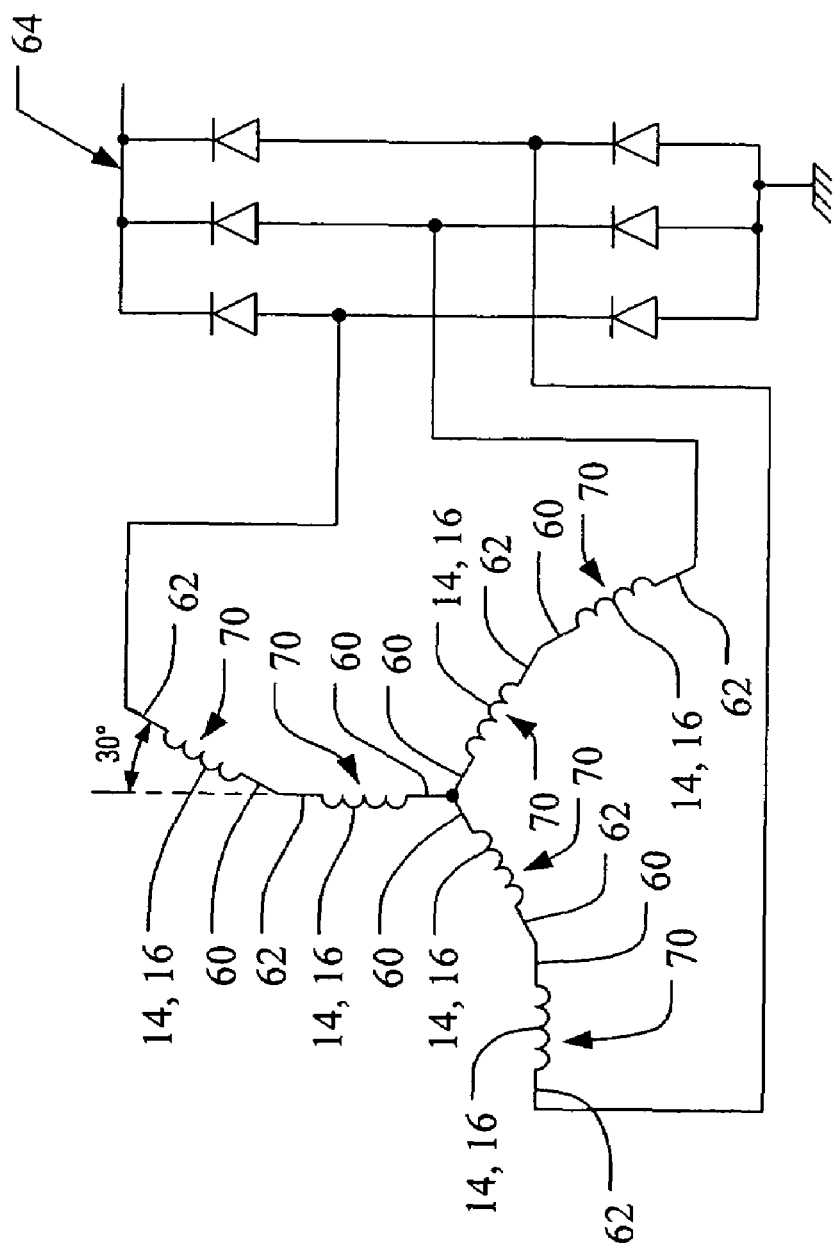
FIG. 9 is a schematic view of a stator with a cascaded winding of the present invention wherein the conductors are connected in a modified-wye arrangement.

The previously mentioned six phase connection schemes result in six phases being connected to rectifiers 64 having six pairs of switching elements. Although the switching elements are schematically represented by diodes FIGS. 7, 7a and 8, it is understood by those skilled in the art that the rectifiers 64 may use other types of switching elements such as, but not limited to, transistors. Having six pairs of switching elements may be detrimental to the cost of the stator assembly. Therefore referring to FIG. 9, the first ends 60 of a first phase, comprised of conductors 14, 16, having slot segments 22 disposed in particular core slots 12, is connected in series to the second ends 62 of a second phase, comprised of conductors 14, 16, having slot segments 22 disposed in adjacent core slots 12, thereby creating a modified-phase 70. The modified-phases 70 are therefore comprised of a first phase and a second phase, wherein the second phase is phase shifted by 30 electrical degrees from the first phase. This connection scheme is similarly repeated for two other pairs of phases thereby creating two more modified-phases 70. The first ends 60 of the second phases are connected to a neutral bundle and the second ends 62 of the first phases are connected to a rectifier 64 to form a modified-wye arrangement.

Figure 10:
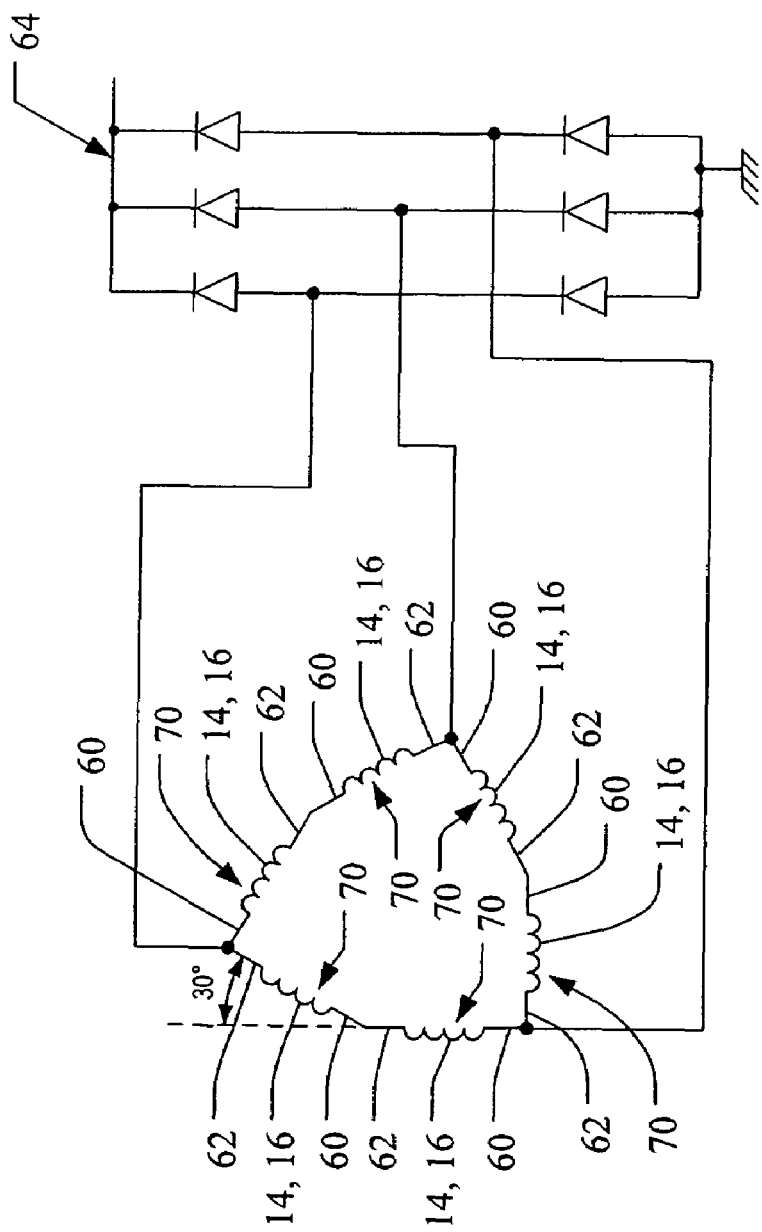
FIG. 10 is a schematic view of a stator with a cascaded winding of the present invention wherein the conductors are connected in a modified-delta arrangement.

Alternatively, referring to FIG. 10, the first end 60 of the second phase is connected to the second end 62 of the first phase and then to the rectifier 64, for each pair of phases, to form a modified-delta arrangement. The modified-delta and modified-wye connection schemes advantageously result in a relatively inexpensive six-phase stator having a reduced amount of switching elements and being composed of conductors 14, 16 that are formed from continuous cascaded conductors for a circumference around the stator core 10.

The foregoing discussion discloses and describes various embodiments of the invention. One skilled in the art will readily recognize from such discussion, and from the accompanying drawings and claims, that changes and modifications can be made to the invention without departing from the fair scope of the invention as defined in the following claims. The invention has been described in an illustrative manner, and it is to be understood that the terminology which has been used is intended to be in the nature of words of description rather than of limitation.

What is claimed is:

1. A method of forming a cascaded stator winding comprising:
   providing a stator core having a plurality of circumferentially spaced and axially-extending core slots in a surface thereof;
   forming a plurality of A conductors;
   forming a plurality of B conductors;
   arranging the plurality of A and B conductors into a wire pack;
   rolling the wire pack into a cylindrical shape having an outer dimension which allows it to be placed within the stator core;
   placing the wire pack within the stator core; and
   expanding the wire pack radially outward such that the slot segments of the wire pack are inserted within the core slots of the stator core.

2. The method of claim 1 wherein the arranging of the plurality of A and B conductors into a wire pack includes:
   sequentially loading the plurality of A conductors into a magazine with each subsequent A conductor shifted one pitch in a first direction of the previous A conductor;
   sequentially loading the plurality of B conductors into the magazine, having the at least half of the slot segments of the B conductors laying on top of the slot segments of the A conductors, with each subsequent B conductor shifted one pitch in a second direction of the previous B conductor, wherein the second direction is opposite of the first direction.

3. The method of claim 2 wherein the first B conductor is placed onto the magazine of A conductors such that one of the slot segments of the B conductor is shifted one pitch from one of the slot segments of the first A conductor.

4. The method of claim 2 wherein the forming of a plurality of A conductors includes:
   forming a plurality of single continuous conductors such that each A conductor includes a plurality layers having a plurality of slot segments alternately connected at first and second ends by a plurality of end loop segments, wherein at least half of the end loop segments each include a first sloped portion and a second sloped portion that meet at an apex portion, wherein the slot segments of each layer are radially aligned with one another, the first sloped portion of the end loop segment is radially aligned with the slot segments, and the second sloped portion of the end loop segment is radially offset from the slot segments and the first sloped portion.

5. The method of claim 4 wherein the forming of a plurality of B conductors includes:
   forming a plurality of single continuous conductors such that each B conductor includes a plurality of layers having a plurality of slot segments alternately connected at first and second ends by a plurality of end loop segments, wherein at least half of the end loop segments each include a first sloped portion and a second sloped portion that meet at an apex portion, wherein the slot segments of each layer are radially aligned with one another, the second sloped portion of the end loop segment is radially aligned with the slot segments, and the first sloped portion of the end loop segment is radially offset from the slot segments and the second sloped portion.

6. The method of claim 5 wherein the rolling of the wire pack into a cylindrical shape includes rolling the wire pack into a cylindrical shape such that the layers are radially aligned and that slot segments of a plurality of layers are positioned to be accepted within the same slots within the stator core, wherein the outer dimension of the wire pack allows the wire pack to be placed within the stator core.

7. The method of claim 6 wherein providing the stator core, just prior to insertion, having core slots with a circumferential width larger than the circumferential width of the slot segments at the inner diameter and further including a stator varnish process to bond the conductors to themselves and to the slot liners.

8. The method of claim 6 wherein the magazine is a circular magazine having a number of slots equal to at least the number of core slots times the number of layers divided by two.

9. The method of claim 6 wherein the magazine is a linear magazine having a number of slots equal to at least the number of core slots times the number of layers divided by two.

10. The method of claim 6 wherein the magazine has a number of slots equal to at least the number of core slots times the number of layers divided by two, plus the number of phases.

11. The method of claim 6 wherein the A conductors of a particular phase and the B conductors of the same particular phase are connected to one another, for each phase.

12. The method of claim 11 further including connecting the A conductors of a particular phase and the B conductors of the same particular phase in series to form a phase having a number of electrical turns equal to the number of the layers.

13. The method of claim 11 further including connecting the A conductors of a particular phase and the B conductors of the same particular phase in parallel to form a phase having a number of electrical turns equal to half of the number of the layers.

14. The method of claim 11 further including connecting neutral ends of the conductors into neutral bundles and connecting positive ends of the conductors to a rectifier to form a wye structure.

15. The method of claim 14 wherein arranging a wire pack results in a wire pack having at least six phases and further including connecting the neutral ends of every other one of the phases into at least one neutral bundle, and connecting the neutral ends of the other remaining half of the phases into at least a second neutral bundle thereby forming a multiple wye winding.

16. The method of claim 11 further including connecting positive ends of the conductors of one phase to neutral ends of conductors of another phase and then to a rectifier to form a delta structure.

17. The method of claim 16 wherein arranging a wire pack results in a wire pack having at least six phases and further including connecting the neutral ends of every other one of the phases to the positive ends of half the phases and connecting the neutral ends of the other remaining half of the phases to the positive ends of the other half the phases thereby forming a multiple delta winding.

18. A method of forming a cascaded stator winding comprising:
   providing a stator core having a plurality of circumferentially spaced and axially-extending core slots in a surface thereof, and having a circumferential width of the core slots at the inner diameter of the stator core;
   providing a plurality of conductors having a circumferential width narrower than the circumferential width of the core slots just prior to insertion;
   forming a plurality of six A conductors such that each A conductor includes a plurality layers having a plurality of slot segments alternately connected at first and second ends by a plurality of end loop segments, wherein at least half of the end loop segments each include a first sloped portion and a second sloped portion that meet at an apex portion, wherein the slot segments of each layer are radially aligned with one another, the first sloped portion of the end loop segment is radially aligned with the slot segments, and the second sloped portion of the end loop segment is radially offset from the slot segments and the first sloped portion, forming a plurality of six B conductors such that each B conductor includes a plurality of layers having a plurality of slot segments alternately connected at first and second ends by a plurality of end loop segments, wherein at least half of the end loop segments each include a first sloped portion and a second sloped portion that meet at an apex portion, wherein the slot segments of each layer are radially aligned with one another, the second sloped portion of the end loop segment is radially aligned with the slot segments, and the first sloped portion of the end loop segment is radially offset from the slot segments and the second sloped portion, sequentially loading a plurality of A conductors into the magazine with each subsequent A conductor shifted one pitch in a first direction of the previous A conductor and having at least half of the slot segments disposed in the outer portion of the magazine;

sequentially loading a plurality of B conductors into the magazine, with each subsequent B conductor shifted one pitch in a second direction of the previous B conductor, wherein the second direction is opposite of the first direction and having at least half of the slot segments disposed in the inner portion of the magazine;

rolling the wire pack into a cylindrical shape having a plurality of radial aligned layers and having an outer dimension which allows it to be placed within the stator core;

placing the wire pack within the stator core;

expanding the wire pack radially outward such that the slot segments of the wire pack are inserted within the core slots of the stator core;

bonding the conductors to themselves and to the slot liners;

connecting the leads of the A conductors of a particular phase and B conductors of the same particular phase, for each phase, thereby forming neutral ends and positive ends for each phase and a winding having a plurality of electrical turns.

19. The method of claim 18 further including connecting the neutral ends of half the phases into at least one neutral bundle, and connecting the neutral ends of the other half of the phases into at least a second neutral bundle thereby forming a multiple wye winding.

20. The method of claim 18 further including connecting the neutral ends of half the phases to the positive ends of half the phases and connecting the neutral ends of the other half the phases to the positive ends of the other half the phases thereby forming a multiple delta winding.

* * * * *

UNITED STATES PATENT AND TRADEMARK OFFICE
CERTIFICATE OF CORRECTION

PATENT NO. : 7,386,931 B2
APPLICATION NO. : 10/895567
DATED : June 17, 2008
INVENTOR(S) : Kirk E. Neet et al.

Page 1 of 1

It is certified that error appears in the above-identified patent and that said Letters Patent is hereby corrected as shown below:

In column 7, in claim 4, line 4, after "includes a plurality" insert --of--.

In column 8, in claim 18, line 11, after "includes a plurality" insert --of--.

Signed and Sealed this

Twenty-first Day of October, 2008

JON W. DUDAS
*Director of the United States Patent and Trademark Office*